United States Patent [19]

Butter et al.

[11] 3,894,107

[45] July 8, 1975

[54] CONVERSION OF ALCOHOLS, MERCAPTANS, SULFIDES, HALIDES AND/OR AMINES

[75] Inventors: Stephen A. Butter, East Windsor; Anthony T. Jurewicz, Kendall Park; Warren W. Kaeding, Westfield, all of N.J.

[73] Assignee: Mobil Oil Corporation, New York, N.Y.

[22] Filed: Aug. 9, 1973

[21] Appl. No.: 387,223

[52] U.S. Cl.......... 260/668 R; 260/673; 260/676 R; 208/141
[51] Int. Cl.².......................................... C07C 15/02
[58] Field of Search..... 260/668, 673, 673.3, 449 R, 260/449 M, 676 R; 48/197; 208/141

[56] References Cited
UNITED STATES PATENTS

| | | | |
|---|---|---|---|
| 3,728,408 | 4/1973 | Tobias | 260/668 C |
| 3,751,504 | 8/1973 | Keown et al. | 260/672 T |
| 3,751,506 | 8/1973 | Burress | 260/671 R |
| 3,755,483 | 8/1973 | Burress | 260/671 R |

*Primary Examiner*—C. Davis
*Attorney, Agent, or Firm*—Charles A. Huggett; Michael G. Gilman

[57] ABSTRACT

Process of converting alcohols, aliphatic mercaptans, aliphatic sulfides, aliphatic halides and/or aliphatic amines to other desirable products by contacting such with a particular type of aluminosilicate molecular sieve catalyst at elevated temperature. Products produced by such conversion vary with temperature, with conversion to aromatic rings and substituted aromatic rings predominating at higher temperatures of about 300° to 500°C. The catalyst is a zeolite having a high silica to alumina ratio of at least about 12 and a constraint index of about 1 to 12. It also preferably has a crystal density in the hydrogen form of not substantially less than about 1.6.

21 Claims, No Drawings

CONVERSION OF ALCOHOLS, MERCAPTANS, SULFIDES, HALIDES AND/OR AMINES

This invention relates to conversion of certain organic compounds to other, more complicated organic compounds.

There has recently been discovered a certain novel class of crystalline aluminosilicate zeolites which have been shown to have unusual properties. These catalysts induce profound transformations of aliphatic hydrocarbons to aromatic hydrocarbons in commercially desirable yields. Although they have unusually low alumina contents, i.e. high silica to alumina ratios, they are very active even when the silica to alumina ratio exceeds 30. The activity is surprising since the alumina in the zeolite framework is believed responsible for catalytic activity. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalyst useful in this invention posess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight-membered rings of oxygen atoms, then access to molecules of larger cross-section than normal hexane is excluded and the zeolite is not of the desired type. Windows of 10-membered rings are preferred, although excessive puckering or pore blockage may render these catalysts ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a catalyst posesses the necessary constrained access, a simple determination of the "constraint index" may be made by passing continuously a mixture of equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000°F for at least 15 minutes. The catalyst is then flushed with helium and the temperature adjusted between 550° and 950°F to give an overall conversion between 10 and 60%. The mixture of hydrocarbons is passed at 1 liquid hourly spaced velocity (i.e. 1 volume of hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The constraint index is calculated as follows:

$$\text{Constraint Index} = \frac{\text{Log}_{10}\,(\text{fraction of n-hexane remaining})}{\text{Log}_{10}\,(\text{fraction of 3-methylpentane remaining})}$$

The constraint index approximates the ratio of the cracking rate constants for the two hydrocarbons. Catalysts suitable for the present invention are those having a constraint index from 1.0 to 12.0, preferably 2.0 to 7.0

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft No. 2,213,109, the entire contents of which are incorporated herein by reference.

ZSM-21 is more particularly described in U.S. application, Ser. No. 358,192, filed May 7, 1973, now abandoned, the entire contents of which are incorporated herein by reference.

TEA mordenite is more particularly described in U.S. application Ser. No. 130,442 filed Apr. 11, 1971, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000°F for 1 hour, for example, followed by base exchange with ammonium salts followed by calcination at 1000°F in air. The presence of organic cations in the forming solution may not be absolutely essential to the formation of this type zeolite; however, the presence of these cation does appear to favor the formation of this special type of zeolite. More generally, it is desirable to activate this type catalyst by base exchange with ammonium salts followed by calcination in air at about 1000°F for from about 15 minutes to about 24 hours.

Natural zeolites may sometimes be converted to this type zeolite catalysts by various activation procedures and other treatments such as base exchange, steaming, alumina extraction and calcination, in combinations. Natural minerals which may be so treated include ferrierite, brewsterite, stillbite, dachiardite, epistilbite, heulandite and clinoptilolite. The preferred crystalline aluminosilicates are ZSM-5, ZSM-11, ZSM-12, ZSM-21 and TEA mordenite, with ZSM-5 particularly preferred.

The catalysts of this invention may be in the hydrogen form or they may be base exchanged or impregnated to contain ammonium or a metal cation complement. It is desirable to calcine the catalyst after base exchange. The metal cations that may be present include any of the cations of the metals of Groups I through VIII of the periodic table. However, in the case of Group IA metals, the cation content should in no case be so large as to effectively inactivate the catalyst. For example, a completely sodium exchanged H-ZSM-5 is not operative in the present invention.

In a preferred aspect of this invention, the catalysts hereof are selected as those having a crystal density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred catalysts of this invention are those having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

A remarkable and unique attribute of this type of zeolite is their ability to convert paraffinic hydrocarbons to aromatic hydrocarbons in exceptionally fine, commercially attractive yields by simply contacting such paraffins with such catalyst at high temperatures of about 800° to 1500°F and low space velocities of about 1 to 15 WHSV. This type of zeolite seems to exert little or no action upon aromatic rings present in the feed to such process or formed in such process from the point of view of destroying (cracking) such rings. It does however have the ability, with or without the presence of a special hydrogen transfer functionality and with or without the presence of added hydrogen in the reaction mixture, to cause paraffinic fragments, which presumably have been cracked from paraffinic feed components, to alkylate aromatic rings at somewhat lower temperatures of up to about 800° to 1000°F. It appears that the operative ranges for alkylation and formation of new aromatic rings overlap but that the optimum ranges are distinct, aromatization being at a higher temperature. The exact mechanisms for these catalytic functions are not fully known or completely understood.

It is generally believed by those knowledgeable in the crystalline zeolite art, that contact of a zeolite with steam is deleterious to the catalytic properties thereof and that increase in pressure, temperature and/or time of contact increases the adverse effects on the catalyst. While this type zeolite is substantially more steam stable than other zeolites, it has been found to be possible to reduce or eliminate its aromatization catalytic activity. Aromatization of aliphatic hydrocarbons as described in U.S. Pat. application Ser. No. 253,942, filed May 17, 1972, now U.S. Pat. No. 3,756,942, has been attempted using this type of aluminosilicate which had previously been severely steam treated. It was found to be substantially impossible to aromatize paraffinic hydrocarbons as set forth in such patent application with such deactivated catalyst.

It is known that many acid catalysts are capable of assisting in the dehydration of alcohols to ethers and/or olefins. In the case of methanol, such dehydration reactions have proceeded to dimethyl ether as the principal product. In all or at least most of these prior processes, the dehydrated product had a longest carbon atom chain lenght which was not longer than the longest carbon atom chain length of the reactant. For the most part, such dehydration reactions did not produce products having a molecular weight in any given hydrocarbon portion which was higher than the molecular weight of the hydrocarbon portion of the reactant.

Alkanols of 2 or more carbon atoms were generally dehydrated to their corresponding olefins or to their corresponding ethers e.g. ethanol to ethylene and/or diethyl ether or isopropanol to propylene or diisopropyl ether. Methanol, on the other hand, represented a special case in that it has only 1 carbon atom and therefore could not be dehydrated to an olefin. Methanol dehydrated to dimethyl ether with the usual prior art dehydration process and catalyst.

It is an object of this invention to provide a novel process for converting various aliphatic hetero compounds of the R-X type to other valuable products, particularly higher hydrocarbons.

It is another object of this invention to convert aliphatic alcohols, halides, mercaptans, sulfides and/or amines to their corresponding ethers or analogous compounds in a very efficient manner.

It is a further object of this invention to convert alcohols to their corresponding olefins in a very efficient manner.

It is still another object of this invention to provide a novel process for converting alcohols and/or other aliphatic hetero atom containing compounds to products having a greater number of carbon atoms in a continuous hydrocarbon portion of the product than in the feed.

Other and additional objects of this invention will become apparent from a consideration of this entire specification including the claims hereof.

In accord with and fulfilling these objects, one aspect of this invention lies in the discovery that hetero organic compounds of the R-X type are convertible to other organic chemical products, notably aromatic hydrocarbons, by contacting such compounds with an aluminosilicate molecular sieve zeolite having a silica to alumina ratio of at least about 12 and a constraint index of about 1 to 12 at elevated temperatures up to about 1000°F, preferably about 500° to 850°F, a pressure of about atmospheric to 1000 psig, preferably 0.5 to 75 psig, a space velocity of about 0.5 to 50 WHSV in the presence or absence of added hydrogen.

The reactants useful in this invention have been designated to be of the R-X type where R stands for an aliphatic hydrocarbon moiety, X stands for a hetero atom such as sulfur, nitrogen, halogen or oxygen. The types of reactant compounds found to be useful in this invention are alcohols, mercaptans, sulfides, halides and amines. The aliphatic hydrocarbon moiety suitably has up to about 8 carbon atoms therein, preferably about 1 to 4 carbon atoms.

According to this invention, the reactive feed to the process hereof is critically defined as consisting essentially of lower aliphatic organic hetero compounds. This feed definition is specifically intended to distinguish from feeds used in alkylation reactions catalyzed by ZSM-5 type of synthetic aluminosilicate molecular sieve. In such alkylation reactions, which are considered to be the invention of other than the instant applicants, alkylating moieties, which may be alcohols and/or other compounds, are reacted with preformed and co-reacted aromatic moieties. In other words, alkylation requires the co-feeding of aromatic moieties and alkylating moieties such as alcohols. The instant process is to be distinguished in that it does not require or desire the co-feeding of preformed aromatic moieties.

In this regard two very important points must be emphasized: In the first place, it has now been discovered that the presence of preformed aromatic moieties as a co-feed to this reaction does not negate the aromatization conversion of the reactants designated above as the feed to the instant process; In the second place, new aromatic moieties created from the reactants hereof by the conversion process of this invention are themselves sometimes alkylated under these processing conditions by the alkylating action of the alcohol or other reactant and/or one or more intermediate moiety formed in the reaction being undergone. The process of this invention must therefore be distinguished from an alkylation reaction per se carried out with the same catalyst and under co-extensive reaction conditions.

In its broadest aspects, this invention envisions a process for condensing certain feed materials and growing the products thus formed into significantly different chemical moieties. The commercially most important aspect of this invention may be the conversion of lower alcohols to olefinic and/or aromatic hydrocarbon compounds as aforesaid. However, as an adjunct to this conversion, the reaction can be carried out under different conditions but with the same catalyst to produce somewhat different chemical values. For example, lower alkyl alcohols can be converted to lower alkyl ethers when this process is operated at low temperatures. At intermediate temperatures and severities olefins of various chain length are formed from alcohol reactants.

While at first glance, the formation of olefins by contacting alcohols or other compounds with hetero atoms with an acidic zeolite at elevated temperatures might not seem too surprising, it must be pointed out that the olefins formed do not necessarily conform to the carbon configuration of the reactant. While simple "dehydration" to form a corresponding olefin may take place to a greater or lesser extent depending upon reaction conditions, the produced olefin often does have a longer carbon to carbon chain than did the reacting moiety from which it was derived. It is even more surprising that one can produce olefins such as ethylene and propylene from methanol, that is effectively a one carbon atom reactant.

According to this invention aromatics are produced from lower aliphatic hetero compounds, particularly alcohols, at about 300° to 500°C, 0.5 to 75 psig and 0.5 to 50 WHSV. Reducing the severity of the reaction conditions at about 350 to 500°F, 0.5 to 2.0 psig and 1 to 5 WHSV, causes the reaction to proceed toward ethers as the predominant product.

Suitable reactants for use in this invention are lower aliphatic alcohols, preferably lower straight or branched chain alkanols, such as methanol, ethanol, iso and normal propanol, butanols, pentanols, hexanols, cyclo hexanol heptanols, octanols such as 2 - ethyl hexanol and isooctanol, their unstaurated counterparts, or mixtures thereof such as oxoalcohol mixtures. Nitrogen, halogen and sulfur analogues thereof such as methyl mercaptan, methyl amine, ethyl mercaptan, n-butyl amine, cyclohexyl amine, methyl sulfide, etc., as well as mixtures thereof; and mixtures of such alcohols and other materials as aforesaid. These reactants may be used as pure or impure chemical streams including the unresolved product of upstream processing intended to produce such alcohols or other hetero aliphatic compounds as a predominant product.

It is within the scope of this invention to convert the alcohol or other noted feed compounds as pure individual compounds or as admixtures of normal chemical purity. It is also within the scope of this invention to feed such individual reactants in admixture with other different materials. These other feed materials may be reactive or inert under the conditions of this process. Their presence or absence is not a part of this invention. Thus, for example, it is the subject of concurrently filed patent applications of different inventors to convert carbonyl containing compounds or alkoxy type compounds to more complex compounds under substantially the same conditions as are set forth herein. The co-feeding and co-reaction of the feeds, or one of them, set forth in said other patent application with the feeds of this application, including possible interaction of these feeds and/or intermediates produced therefrom is not considered to be outside the scope of either this or that patent application. Rather, such is considered to be within the scope of each respective application as to that portion of the feed related to that application.

It is surprising and indeed quite unexpected that this process should work as well as it does in view of the fact that it produces 1 mole of steam, ammonia, hydrogen sulfide, hydrogen halide, etc. per mole of reactant converted to hydrocarbon product. Since the presence of steam and other similar molecules at elevated temperatures is known to adversely affect the catalytic activity of most zeolite catalysts in general, and it is known that steam can deactivate the instant type of aluminosilicate for hexane aromatization reactions, the fact that the instant described aromatization of hetero atom containing compounds not only takes place in this atmosphere but seems not to be adversely affected by this environment, in which it is necessarily carried out, is surprising.

An additional unexpected aspect of this invention resides in the discovery that, although it is usual and common for conversion reactions carried out in the presence of and in contact with zeolite catalysts in general and ZSM-5 type of aluminosilicate zeolite catalyst in particular to form coke and deposit such on the zeolite catalyst whereby gradually deactivating the catalyst, the coke make deposited on this type of catalyst in the process of this invention is exceedingly small, much smaller than that encountered when subjecting corresponding hydrocarbon feeds to the same conversion conditions.

It is interesting to note that while aromatization of hydrocarbons, even unsaturated hydrocarbons, is initiated to a meaningful extent at about 650°F and is maximized from a commercially desirable product distribution point of view at about 1000°F, aromatization of lower alcohols or other R-X materials to generally the same commercially acceptable product distribution initiates at about 500°F and is maximized at about 750°F. Contacting aliphatic hydrocarbons with this type of aluminosilicate zeolites in the same temperature and other operating condition ranges as set forth above according to this invention does not induce significant production of new aromatic rings but more usually tends to alkylate preformed, co-fed aromatic ring moieties. In this regard it should be understood that there is not a clear line of demarcation between operation conditions which induce alkylation as opposed to aromatization of fed aliphatic hydrocarbons according to previously described processes. Similarly, there is not a clear line of demarcation in product distribution as a function of temperature in the process of this invention. It can be said in general that lower temperatures favor ether formation, intermediate temperatures favor olefin formation and higher temperatures, which are still generally lower than hydrocarbon aromatization temperatures, favor aromatization.

The following Examples are illustrative of this invention without being limiting on the scope thereof.

EXAMPLES 1–6

In these Examples, methanol was contacted with 10 parts by weight of H ZSM-5 at low space velocities and varying temperatures. The products produced from methanol conversion were determined. All data from these runs are set forth in the following Table 1.

TABLE 1

| Example No. | 1 | 2 | 3 | 4 | 5 | 6 |
|---|---|---|---|---|---|---|
| Temp. (°F) | 297 | 405 | 518 | 630 | 710 | 813 |
| Feed (parts by weight per hr.) | 8.4 | 7.64 | 7.13 | 6.34 | 6.57 | 7.84 |
| Methanol conversion (%) | 16.9 | 75 | 64 | 100 | 100 | 100 |
| WHSV | 0.84 | 0.76 | 0.71 | 0.63 | 0.66 | 0.78 |
| Product Selectivity (%) | | | | | | |
| Dimethyl ether | 99 | 99 | 90 | 0 | 0 | 0 |
| Aliphatic hydrocarbons | 0 | 0 | 10 | 60 | 55 | 54 |
| Aromatic hydrocarbons | 0 | 0 | 0 | 40 | 45 | 46 |

EXAMPLES 7 and 8

In these Examples, ethanol was contacted with 10 parts by weight of H ZSM-5 at 1 to 2 WHSV and different temperatures. The products produced from ethanol were determined.

| Example No. | 7 | 8 |
|---|---|---|
| Temp. (°F) | 585 | 690 |
| Feed (parts by weight per hr.) | 9.65 | 10.05 |
| Products (major) | predominantly aliphatic hydrocarbons in the $C_5^+$ range | similar to 7 with higher aromatic content |

EXAMPLES 9–17

In a manner similar to that referred to above in Examples 1 through 8, other reactants were converted in contact with H ZSM-5 as set forth below.

TABLE 2

| Example Nos. | 9 | 10 | 11 | 12 |
|---|---|---|---|---|
| Reactant | Isopropanol | 2-ethyl-hexanol | Mixed oxo-alcohols | Mixed pentanols |
| Temperature °F | 350 | 700 | 800 | 800 |
| WHSV | 1.5 | 0.5 | 0.5 | 0.5 |
| Reactant Conversion % | 62 | 90 | 99 | 99 |
| Products Formed | 10% Isopropyl ether(a) | 40–50% aromatic hydrocarbons | 40–50% aromatic hydrocarbons | 49–50% atomatic hydrocarbons |
| | 90% Propylene (a) hydrocarbons Water | 40–50% aliphatic hydrocarbons Water | 40–50% aliphatic hydrocarbons Water | 40–50% aliphatic Water |

NOTE: (Water) is a product. The organic portion (a) totals up to 100% of the organic product.
(a) organic product

EXAMPLES 18–24

The following Examples illustrate the conversion of mixtures of methanol and propylene, according to this invention, upon contact with 8.35 parts by weight of H ZSM-5 at the conditions shown.

TABLE 3

| Example No. | 18 | 19 | 20 | 21 | 22 | 23 | 24 |
|---|---|---|---|---|---|---|---|
| Temp. (°F) | 320 | 378 | 252 | 299 | 356 | 392 | 472 |
| Propylene feed (in moles/min.) | 2.5 | 2.5 | 2.5 | 2.5 | 2.5 | 2.5 | 2.5 |
| Methanol feed (pts./min.) | 4.1 | 4.2 | 4.0 | 1.9 | 1.8 | 1.7 | 1.7 |
| Methanol conversion % | 40 | 22 | low | 4 | 10 | 19 | high |
| Product Selectivity % | | | | | | | |
| Dimethyl ether | 82.5 | 86 | 0 | 82 | 75 | 79 | 0 |
| Methyl isopropyl ether | 17.5 | 14 | 100 | 18 | 25 | 21 | 0 |
| Diisopropyl ether | | | | Negligible | | | |
| Aliphatic hydrocarbon | — | — | — | — | — | — | 60 |
| Aromatic hydrocarbon | — | — | — | — | — | — | 40 |

EXAMPLES 25–26

The following Table 4 reports the results of converting hetero atom containing aliphatics (other than oxygen) to higher hydrocarbons by contact with a zeolite catalyst according to this invention.

TABLE 4

| Example No. | | 25 | 26 |
|---|---|---|---|
| Feed | | Methyl Mercaptan | Tri-n-butyl Amine |
| Temperature °F | | 550 | 500 |
| WHSV | | 1.4 | 2.3 |
| Aliph WT % | $H_2$ | — | .24 |
| | CO | 0 | 0 |
| | $CO_2$ | 0 | 0 |
| | $CH_4$ | 19.53 | .98 |
| | $C_2H_6$ | 3.23 | 4.38 |
| | $C_2H_4$ | 1.00 | 5.34 |
| | $C_3H_8$ | 3.23 | 1.54 |
| | $C_3H_6$ | .65 | 17.93 |
| | $iC_4H_{10}$ | .23 | .31 |
| | $nC_4H_{10}$ | .23 | 1.70 |
| | $C_4H_8$ | .23 | 39.56 |
| | $C_4H_6$ | 0 | 4.87 |
| | $C_5$ | 0 | 8.78 |
| | $C_6$ | 0 | 3.42 |
| | $C_7+$ | 0 | 2.47 |
| Wt. % | $CH_3SH$ | 3.9 | — |
| | $(CH_3)_2S$ | 3.5 | — |
| | $H_2S$ | 50.6 | — |
| | $CS_2$ | 8.4 | — |
| Arom. Wt. % | Benzene | 2.10 | .59 |
| | Toluene | 1.61 | .80 |
| | Xylenes | .32 | 1.55 |
| | $ArC_5$ | .05 | 1.44 |
| | $ArC_{10}$ | .97 | 1.85 |
| Aliphatic | Wt.% | 31.40 | 93.37 |
| Aromatic | Wt.% | 1.83 | 6.63 |
| S-Compos | Wt.% | 15.8 | — |
| $H_2S$ | Wt.% | 50.6 | — |
| Conversion % | | 96.1 | 97.5 |
| Material Bal.% | | | 97.6 |

The process of this invention can be carried out in rather conventional up-flow or down-flow reactors packed with an aluminosilicate zeolite catalyst as defined herein. The zeolite catalyst alone or in a matrix suitably occupies about 75 to 95% of the reaction zone volume. It may be used in a fixed or fluidized bed arrangement. Suitable heating and/or cooling means may be employed according to conventional reaction zone temperature profiling design. The catalyst is suitably of a particle size of about 8 to 12 mesh of compacted crystal. If fluidized bed operation is undertaken, the catalyst will be necessarily be used in smaller particle size and will occupy less of the reactor volume as is well known and conventional fluidized bed practice.

Attention is directed to U.S. Pat. No. 3,036,134 issued May 22, 1962 in the name of Mattox which discloses the conversion of lower alkanols to their respective ethers at 350° to 800°F in contact with crystalline aluminosilicate catalyst. The general and specific description of the catalyst in this reference neither includes nor suggests ZSM-5 type of zeolite. Further, it is pointed out that while the reference shows substantially complete conversion of methanol to dimethyl ether at 500°F, the catalyst of this invention causes a much lower ether production at this temperature and a much higher hydrocarbon production. Incidentally, Mattox does not appear to have produced aromatics with his process.

What is claimed is:

1. In a process of condensing an aliphatic organic compound of the formula R-X where X is at least one of halogen, oxygen, sulfur or nitrogen by contacting such with a high silica to alumina ratio crystalline aluminosilicate zeolite catalyst; the improvement which comprises: utilizing a catalyst comprising such zeolite having a silica to alumina ratio of at least about 12 and a constraint index of about 1 to 12; condensing at a temperature of about 500° to 1000°F, a pressure of about 0.5 to 1000 psig and a space velocity of about 0.5 to 50 WHSV; and converting said organic compound reactant to a product comprising a complex mixture of compounds including hydrocarbon compounds having a greater number of carbon atoms than said organic compound reactant, a higher ratio of carbon atoms to hetero atoms than said organic compound reactant and a longest carbon to carbon chain length which is longer than the longest carbon to carbon chain length of said organic compound reactant.

2. A process as claimed in claim 1 wherein said reactant hetero atom is oxygen and said aliphatic moiety has up to about 4 carbon atoms in a longest carbon to carbon chain constituent thereof.

3. A process as claimed in claim 1 wherein said reactant comprises a mixture of lower alkanols.

4. A process as claimed in claim 1 wherein said reactant comprises a lower alkanol.

5. A process as claimed in claim 1 wherein said aliphatic organic compound reactant is an alcohol having up to about 8 carbon atoms in its longest carbon to carbon chain and wherein said hydrocarbon compound products comprise a mixture of aromatic hydrocarbons.

6. A process as claimed in claim 1 wherein said product comprises $C_4^-$ and $C_5^+$ hydrocarbons.

7. A process as claimed in claim 1 carried out in contact with H-ZSM-5.

8. A process as claimed in claim 1 wherein said reactant comprises methanol.

9. A process as claimed in claim 1 wherein said reactant consists essentially of methanol.

10. A process as claimed in claim 1 wherein said zeolite has a crystal density in the hydrogen form of not substantially less than about 1.6 grams per cubic centimeter.

11. The conversion of lower alcohols or mixtures thereof with different materials to respectively different organic compound products, which products have respectively a higher carbon to oxygen ratio and at least the same longest carbon to carbon chain length than the reactant from which it was derived, by contacting such with a crystalline aluminosilicate molecular sieve zeolite having a silica to alumina ratio of at least about 12 and a constraint index of about 1 to 12 at an elevated temperature up to about 1000°F under such combination of temperature, pressure and space velocity as to induce said conversion.

12. In the process of condensing a lower aliphatic alcohol having 1 to 8 carbon atoms by contacting such with a crystalline aluminosilicate zeolite having a high silica to alumina ratio of at least 12 under conversion conditions to produce a product comprising water and an organic dehydration product of said alcohol; the improvement which comprises: carrying out said conversion at at least about 500°F; using as catalyst said zeolite having a crystal density of not substantially less than about 1.6 grams per cubic centimeter and a constraint index of about 1 to 12; and converting said alcohol to a product comprising mixed aliphatic and aromatic hydrocarbons.

13. The improved process claimed in claim 12 including selecting said alcohol from at least one member of the group consisting of methanol, ethanol and isopropanol; and converting such to a product comprising $C_5^+$ aliphatic and aromatic hydrocarbons.

14. The improved process claimed in claim 12 wherein said alcohol is methanol.

15. The improved process claimed in claim 12 wherein said zeolite is a ZSM-5.

16. The improved process claimed in claim 12 wherein said zeolite is a ZSM-11.

17. The improved process claimed in claim 12 wherein said zeolite is a ZSM-12.

18. The improved process claimed in claim 12 wherein said zeolite is a ZSM-21.

19. The improved process claimed in claim 12 wherein said zeolite is a TEA Mordenite.

20. The improved process claimed in claim 12 carried out at a nominal temperature of about 750°F to convert said reactant to a product comprising aromatic hydrocarbons.

21. The improved process claimed in claim 12 including co-converting propylene with said alcohol to produce a product comprising aromatic hydrocarbons.

* * * * *